(12) United States Patent
Anderson-Sprecher

(10) Patent No.: US 10,209,063 B2
(45) Date of Patent: Feb. 19, 2019

(54) USING SENSOR-BASED OBSERVATIONS OF AGENTS IN AN ENVIRONMENT TO ESTIMATE THE POSE OF AN OBJECT IN THE ENVIRONMENT AND TO ESTIMATE AN UNCERTAINTY MEASURE FOR THE POSE

(71) Applicant: X Development LLC, Mountain View, CA (US)

(72) Inventor: Peter Elving Anderson-Sprecher, Mountain View, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 157 days.

(21) Appl. No.: 14/874,419

(22) Filed: Oct. 3, 2015

(65) Prior Publication Data
US 2017/0097232 A1 Apr. 6, 2017

(51) Int. Cl.
*G05D 1/02* (2006.01)
*G01B 21/00* (2006.01)
(Continued)

(52) U.S. Cl.
CPC .............. *G01B 21/00* (2013.01); *B25J 5/007* (2013.01); *B25J 9/1697* (2013.01); *G05D 1/021* (2013.01);
(Continued)

(58) Field of Classification Search
CPC .. G05D 1/0274; G05D 1/0246; G05D 1/0088; G01C 21/206; Y01S 901/01
See application file for complete search history.

(56) References Cited

U.S. PATENT DOCUMENTS 5,363,305 A 11/1994 Cox et al.
9,026,248 B1 5/2015 Hickman et al.
(Continued)

FOREIGN PATENT DOCUMENTS

JP 2005032196 2/2005
TW M352099 U 3/2009
TW 201231931 A 8/2012

OTHER PUBLICATIONS

Rebecca Maxwell; "Robotic Mapping: Simultaneous Localization and Mapping (SLAM);" Jan. 15, 2013; GIS Lounge; https://www.gislounge.com/robotic-mapping-simultaneous-localization-and-mapping-slam/.*

(Continued)

*Primary Examiner* — Mischita Henson
*Assistant Examiner* — Christine Liao
(74) *Attorney, Agent, or Firm* — Middleton Reutlinger

(57) ABSTRACT

Methods, apparatus, systems, and computer-readable media are provided for using sensor-based observations from multiple agents (e.g., mobile robots and/or fixed sensors) in an environment to estimate the pose of an object in the environment at a target time and to estimate an uncertainty measure for that pose. Various implementations generate a multigraph based on a group of observations from multiple agents, where the multigraph includes a reference frame node, object nodes, and a plurality edges connecting the nodes. In some implementations, a composite pose and composite uncertainty measure are generated for each of a plurality of simple paths along the edges of the multigraph that connect the reference frame node to a given object node—and a pose and uncertainty measure for an object identifier associated with the given object node is generated based on the composite poses and the composite uncertainty measures.

20 Claims, 12 Drawing Sheets

(51) Int. Cl.
*B25J 5/00* (2006.01)
*B25J 9/16* (2006.01)
*G05D 1/00* (2006.01)
*G01C 21/20* (2006.01)
*G01C 15/00* (2006.01)

(52) U.S. Cl.
CPC ........... *G05D 1/024* (2013.01); *G05D 1/0274* (2013.01); *G05D 1/0297* (2013.01); *G01C 15/00* (2013.01); *G01C 21/20* (2013.01); *G01C 21/206* (2013.01); *G05D 1/0088* (2013.01); *G05D 1/0231* (2013.01); *G05D 1/0234* (2013.01); *G05D 1/0246* (2013.01); *G05D 1/0255* (2013.01); *G05D 1/0261* (2013.01); *G05D 1/0272* (2013.01); *G05D 2201/0203* (2013.01); *Y10S 901/01* (2013.01); *Y10S 901/31* (2013.01); *Y10S 901/47* (2013.01)

(56) References Cited

U.S. PATENT DOCUMENTS

| | | | |
|---|---|---|---|
| 2003/0212472 | A1 | 11/2003 | McKee |
| 2005/0069174 | A1* | 3/2005 | Uchiyama ............... G06T 7/74 382/103 |
| 2005/0182518 | A1* | 8/2005 | Karlsson ............ G05D 1/0246 700/253 |
| 2009/0306881 | A1 | 12/2009 | Dolgov et al. |
| 2010/0082194 | A1* | 4/2010 | Yabushita ............ G05D 1/0217 701/25 |
| 2010/0274387 | A1* | 10/2010 | Pitzer .................... G06N 7/005 700/246 |
| 2011/0153137 | A1 | 6/2011 | Yeom |
| 2011/0208685 | A1* | 8/2011 | Ganapathi .......... G06K 9/00362 706/52 |
| 2011/0231016 | A1 | 9/2011 | Goulding |
| 2012/0121161 | A1* | 5/2012 | Eade .................... G09B 29/007 382/153 |
| 2014/0005933 | A1 | 1/2014 | Fong et al. |
| 2014/0122409 | A1 | 5/2014 | Na et al. |
| 2016/0271795 | A1* | 9/2016 | Vicenti ................... B25J 9/163 |

OTHER PUBLICATIONS

Cyrill Stachniss; "Introduction to Robot Mapping;" WS 2012/13; Albert-Ludwigs-Universität Freiburg; Autonome Intelligente Systeme, pp. 1-45.*
Zhang Yi, Li Yan-Le, Luo Yuan; "Multi-Robot Map Building Based on Ad hoc Network Communication;" Jul. 22, 2011, Chongqing University of Posts and Telecommunications; Proceedings of the 30th Chinese Control Conference; pp. 4007-4010.*
International Search Report and Written Opinion of PCT Ser. No. PCT/US16/54817 dated Jan. 11, 2017.
Gallagher, G., Srinivasa, S. S., Bagnell, J. A., & Ferguson, D. (May 2009). GATMO: A Generalized Approach to Tracking Movable Objects. In Robotics and Automation, 2009. ICRA'09. IEEE International Conference on (pp. 2043-2048). IEEE.
Wolf, D. F., & Sukhatme, G. S. (2003). Towards Mapping Dynamic Environments. In Proceedings of the International Conference on Advanced Robotics (ICAR) (pp. 594-600).
Stilman, M., & Kuffner, J. J. (2005). Navigation Among Movable Obstacles: Real-Time Reasoning in Complex Environments. International Journal of Humanoid Robotics, 2(04), 479-503.
Vasudevan, S., Gachter, S., Nguyen, V., & Siegwart, R. (2007). Cognitive Maps for Mobile Robots—An Object Based Approach. Robotics and Autonomous Systems, 55(5), 359-371.
Thrun, S. (2002). Robotic Mapping: A Survey. Exploring Artificial Intelligence In The New Millennium, 1-35.
Taiwan Intellectual Property Office; Office Action issued in Application No. 105131944 dated Dec. 13, 2017.

* cited by examiner

USING SENSOR-BASED OBSERVATIONS OF AGENTS IN AN ENVIRONMENT TO ESTIMATE THE POSE OF AN OBJECT IN THE ENVIRONMENT AND TO ESTIMATE AN UNCERTAINTY MEASURE FOR THE POSE

BACKGROUND

Robots may be programmed to perform a variety of tasks such as, for example, autonomous or semi-autonomous navigation, manipulating objects (e.g., repositioning an object, altering an object, and/or picking up an object and moving it to a different location), transporting objects (without necessarily manipulating those objects), monitoring environmental conditions, functioning as "video conferencing on wheels", and so forth. Various robots may utilize input from one or more sensors of the robot and/or a curated map of the robot's environment in performing various robotic tasks. For example, a robot may utilize one or more cameras, laser scanners, depth sensors, and/or other sensors to identify and avoid obstacles that are detected in a current movement trajectory of the robot. Also, for example, a robot may utilize a curated map and/or its sensor inputs in planning a movement trajectory to accomplish a task.

However, utilizing input from sensors of a robot to detect objects and act upon such detection may suffer from one or more drawbacks. For example, many sensors have a limited "field of view" and may not detect certain objects such as objects that are not in the line of sight of the sensor. Also, for example, some input from sensors of a robot that are related to an object may be "noisy" due to, for example, other objects "blocking" the line of sight of the sensors, the object being located a relatively far distance away from the sensor, etc. Moreover, utilizing input from a curated map may suffer from one or more drawbacks. For example, the map may be curated at a level of granularity where certain objects are not represented and/or the map may be stale and not reflect the introduction of new objects to the environment, the removal of objects from the environment, and/or a change to the pose of object in the environment. Additional and/or alternative drawbacks of the aforementioned techniques and/or other techniques may be presented.

SUMMARY

The present disclosure is generally directed to using sensor-based observations from multiple agents (e.g., mobile robots and/or fixed sensors) in an environment to estimate the pose of an object in the environment at a target time and to estimate an uncertainty measure for that pose. The object for which the pose and uncertainty measure are estimated may be a non-agent object such as a pallet, a box, a product, etc. or may itself be an agent (e.g., a mobile robot). As used herein, "pose" of an object may reference a position of the object only (e.g., a multidimensional coordinate), or may reference both the position of the object and an orientation of the object (e.g., a pose in the SE(3) configuration space).

A given observation from an agent is generated based on sensor data from one or more sensors of the agent. The given observation may include an observation time, a source identifier of the agent, an observed object identifier of an observed object, a measured object pose for the observed object, and an observation uncertainty measure for the observed object. The observation uncertainty measure for the given observation may be based on, for example, uncertainty associated with the one or more sensors utilized to generate the measured object pose and/or uncertainty associated with a distance between the measured object pose and the utilized sensors. In some implementations, the observation uncertainty measure may be provided as a probability distribution (e.g., a covariance) for the measured object pose. For example, the measured object pose may be provided as a mean pose in the SE(3) configuration space, and the observation uncertainty measure may be provided as an associated Gaussian covariance measure within the six-dimensional tangent space around the mean pose.

Various types of observations may be generated by various agents. For example, sensor data from a sensor (e.g., a camera) mounted on a mobile robot agent may be utilized to generate a "robot to object" observation of an object (a non-agent object or an agent object (e.g., another mobile robot)). In such an example, the observed object identifier would identify the object, the source identifier would identify the mobile robot agent, and the measured object pose would be relative to the mobile robot agent. As another example, sensor data from a fixed sensor (e.g., a fixed camera with a known pose in a "reference frame" such as a world frame) may be utilized to generate a "reference frame to object" observation of an object. In such an example, the observed object identifier would identify the object, the source identifier would identify the fixed sensor, and the measured object pose would be relative to the reference frame. As yet another example, sensor data from a sensor (e.g., GPS) mounted on a mobile robot agent may be utilized to generate a "reference frame to object" observation of the mobile robot agent itself (e.g., the robot localizing itself). In such an example, the observed object identifier would identify the mobile robot agent, the source identifier would also identify the mobile robot agent, and the measured object pose would be relative to the reference frame.

To estimate the pose and the uncertainty measure for each of one or more objects at a target time (e.g., a "current time"), a group of observations for the target time are identified based on the observation times of the observations. For example, one or more observations for each of a plurality of unique "source identifier", "observed object identifier" pairs and that have observation times that are within a threshold amount of time of the target time may be selected for inclusion in the group. For instance, the two observations from each "source identifier", "observed object identifier" pair that are nearest in time to the target time (and that also satisfy the threshold) may be selected if two observations that satisfy the threshold are available. Otherwise, one nearest in time observation that satisfies the threshold may be selected or no observation may be selected.

A multigraph is generated based on the group of observations. The multigraph includes object nodes defining the objects (non-agent objects and agent objects) of the identified group of observations and includes a reference frame node defining a reference frame such as a so-called "world frame." The multigraph further includes edges between the nodes, with each of the edges being defined based on an observation of the identified group of observations. For example, a first edge may be defined between an object node that defines a mobile robot agent and an object node that defines a non-agent object. The first edge may be defined based on an observation that includes an observed object identifier associated with the non-agent object node and a source identifier associated with the mobile robot agent. The first edge further defines the measured object pose and the observation uncertainty measure for the observation.

In some implementations, generating a multigraph based on a group of observations may include combining measured object poses and observation uncertainty measures from two or more observations that have the same object identifier and the same source identifier (i.e., observations with the same "object identifier", "source identifier" pair). For example, a version of spherical linear interpolation (SLERP) generalized to the SE(3) configuration space may be used to interpolate between two observations and the interpolation used to define a single edge in lieu of two separate edges based on the two observations.

For each of a plurality of identified simple paths between the reference frame node and a target node in the multigraph, a composite pose relative to the reference frame node and a composite uncertainty measure for the composite pose are generated by chaining together the poses and the uncertainty measures for the edges that make up the simple path. The composite pose and the composite uncertainty measure can be approximated using an unscented transform (UT) and/or other nonlinear covariance estimation techniques such as Taylor series approximations. In some implementations, a composite pose and composite uncertainty measure are generated for all simple paths between the reference frame node and the target node. In some implementations, the number of simple paths can be reduced by, for example, only looking at simple paths whose edges are all associated with less than a threshold number of observation sources and/or only looking at simple paths with less than a threshold number of edges. For example, some implementations may generate a composite pose and composite uncertainty measure only for simple paths whose edges are associated with a corresponding single observation source.

A pose and uncertainty measure for the target node at the target time is then generated based on the composite pose and the composite uncertainty measures of the simple paths. For example, the generated composite poses and uncertainty measures for the simple paths can be merged to generate the pose and uncertainty measure. For instance, they may be merged using covariance-weighted averaging and/or other data fusion techniques.

The pose and uncertainty measures for the target node at the target time may be assigned to the object identifier on which the target node is based. The object identifier and assigned pose and uncertainty measures may be utilized for various purposes. For example, they may be provided to a robotic agent of the agents to influence one or more tasks to be performed by the robotic agent.

In some implementations, a method may be provided that includes receiving a plurality of observations from a plurality of agents in an environment. Each of the observations is generated based on sensor data from one or more sensors of a corresponding agent of the agents and may include: an observation time, a source identifier of the corresponding agent, an observed object identifier of a corresponding observed object of multiple objects of the environment, a measured object pose for the corresponding observed object, and an observation uncertainty measure for the measured object pose. The method further includes identifying a group of the observations for a target time based on the observation times of the observations of the group satisfying a threshold relative to the target time and generating, based on the group of observations, a multigraph having a plurality of nodes and edges connecting the nodes. Generating the multigraph may include defining a reference frame node of the nodes, defining object nodes of the nodes that are based on the observed object identifiers of the group, and generating the edges connecting the nodes based on the observed object identifiers, the source identifiers, and the measured object poses and observation uncertainty measures of the group. The method further includes generating a composite pose and composite uncertainty measure for each of a plurality of simple paths along the edges that connect the reference frame node and a given object node of the object nodes. The composite pose and the composite uncertainty measure for each of the simple paths is based on the measured object pose and the observation uncertainty measure for each of the edges of the simple path. The method further includes: generating, based on the composite poses and the composite uncertainty measures, a pose and an uncertainty measure for the object identifier on which the given object node is based; and assigning the pose and the uncertainty measure to the object identifier on which the given object node is based.

This method and other implementations of technology disclosed herein may each optionally include one or more of the following features.

In some implementations, the method further includes providing the object identifier and the pose and the uncertainty measure to at least one robotic agent of the agents in the environment.

In some implementations, at least one of the observed object identifiers of the observations identifies one of the agents of the environment.

In some implementations, the object identifier on which the given object node is based identifies a robotic agent of the agents of the environment.

In some implementations, the observed object identifier of a first observation identifies a mobile robot agent of the agents and the source identifier of the first observation identifies the mobile robot agent; and the observed object identifier of a second observation identifies a non-agent object of the agents and the source identifier of the second observation identifies the mobile robot agent. In some of those implementations, the observed object identifier of a third observation identifies the non-agent object of the agents and the source identifier of the third observation identifies a fixed sensor agent of the agents.

In some implementations, generating the pose and the uncertainty measure based on the composite pose and the composite uncertainty measure includes merging the composite poses and the composite uncertainty measures for the plurality of simple paths. In some of those implementations, merging the composite poses and the composite uncertainty measures for the plurality of simple paths includes weighting, in the merging, the composite poses and the composite uncertainty measures based on the composite uncertainty measures.

In some implementations, generating an edge of the edges along a simple path of the simple paths includes: generating the measured object pose and the observation uncertainty measure for the edge based on spherical linear interpolation of the measured object pose and the observation uncertainty measure of a first observation of the observations of the group and the measured object pose and the observation uncertainty measure of a second observation of the observations of the group. The first observation and the second observation both identify the same observed object identifier and the same source identifier.

In some implementations, generating the composite pose and the composite uncertainty measure for each of the plurality of simple paths comprises applying an unscented transform to the measured object poses and the observation uncertainty measures for the edges of the simple path.

Other implementations may include a non-transitory computer readable storage medium storing instructions executable by a processor to perform a method such as one or more of the methods described above. Yet another implementation may include a system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
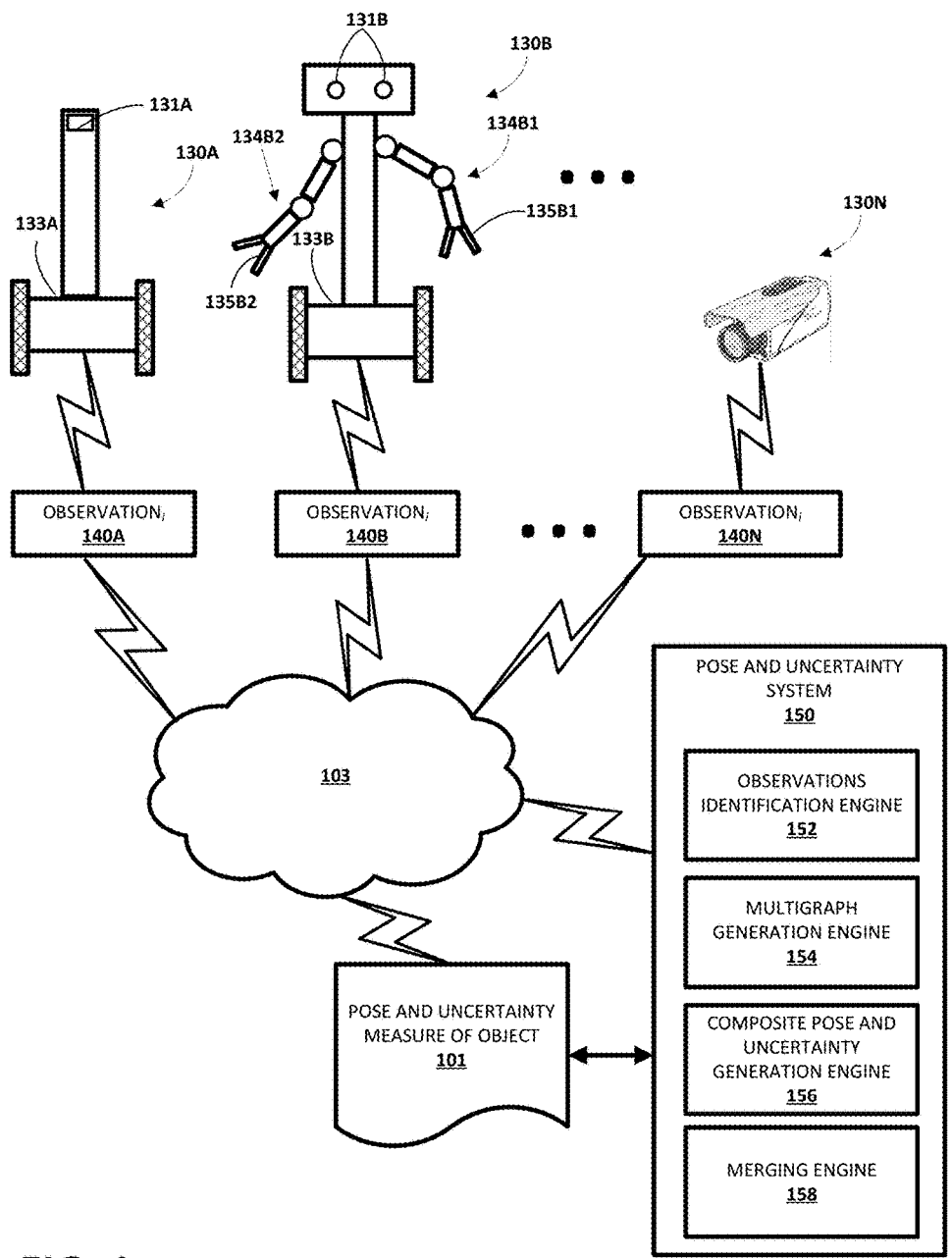
FIG. 1 illustrates an example setting in which observations from multiple agents in an environment may be used to estimate the pose of an object in the environment at a target time and to estimate an uncertainty measure for that pose.

FIG. 1 illustrates an example setting in which observations 140A-N from multiple agents 130A-N in an environment may be used to estimate the pose of one or more objects in the environment at a target time and to estimate uncertainty measures for those poses. Two mobile robot agents 130A and 130B and one fixed camera agent 130N are illustrated in the example environment of FIG. 1. Additional robot agents and/or fixed sensor agents may also be present as indicated by the ellipsis of FIG. 1 that is positioned between mobile robot agent 130B and fixed camera agent 130N.

Also provided in the setting of FIG. 1 is a pose and uncertainty system 150. The observations 140A, 140B, and 140N may be provided by corresponding agents 130A, 130B, and 130N to system 150 via network 103. The system 150 uses one or more of the observations 140A, 140B, and/or 140N to generate a pose of one or more objects in the environment at a target time and to generate uncertainty measures for those poses according to techniques described herein. The network 103 may include one or more networks such as a local area network (LAN) and/or or wide area network (WAN) such as the Internet. In other implementations, a direct connection between one or more components may be utilized.

Each of the agents 130A-N may be located in an environment such as a building (e.g., a warehouse, a manufacturing facility, an office building), one or more buildings of a collection of nearby buildings, one or more floors of a multi-floor office or other building, etc. Additional and/or alternative agents may be provided in other implementations, such as additional robots (mobile and/or non-mobile) and/or additional fixed sensors that vary in one or more respects from those illustrated in FIG. 1. For example, autonomous or semi-autonomous forklift robots may be provided as the only agents and/or with other agents in some implementations.

Each of the mobile robot agents 130A and 130B includes a corresponding base 133A and 133B with wheels provided on opposed sides thereof for locomotion of a corresponding of the mobile robot agents 130A and 130B. Each of the bases 133A and 133B may include, for example, one or more motors for driving corresponding wheels to achieve a desired direction, velocity, and/or acceleration of movement for the corresponding mobile robot agent 130A and 130B.

Each of the mobile robot agents 130A and 130B also includes at least one pose vision device that includes one or more corresponding pose vision sensors. As used herein, a pose vision sensor is a sensor that can sense data related to shape, color, and/or other features of an object that is in the line of sight of the sensor, wherein the sensed data can be used (optionally in combination with other data) to determine a location and/or orientation of the object. As one example of a pose vision device, the mobile robot agent 130A includes a 3D laser scanner 131A that includes one or more lasers that emit light and one or more sensors that collect data related to reflections of the emitted light to enable determination of location and/or orientation of various objects. The laser scanner 131A may be, for example, a time-of-flight 3D laser scanner or triangulation based 3D laser scanners and may include a position sensitive detector (PSD) or other optical position sensor.

As another example of a pose vision device, the mobile robot agent 130B includes a stereo camera 131B that includes two sensors (e.g., charge-coupled devices (CCDs)), each at a different vantage point. By comparing data sensed by the two sensors at different vantage points, position and/or orientation of various objects may be determined. As yet another example of a pose vision device, a robot agent may include a machine vision camera that includes a sensor that captures data related to, inter alia, fiducial tags on objects. Data related to a fiducial tag on an object can be utilized to detect the fiducial tag and determine position and/or orientation of the object based on the fiducial tag. Although specific examples of pose vision devices and associated sensors are described herein, additional and/or alternative pose vision devices and associated sensors may be utilized.

Each of the mobile robot agents 130A and 130B also includes one or more controllers that, for example, provide control commands to actuators and/or other operational components thereof, generate all or aspects of observations described herein, receive and act upon one or more object poses and uncertainty measures determined based on techniques described herein, and/or receive and act upon control commands such as those generated based at least in part on object poses and uncertainty measures determined based on techniques described herein. For example, one or more controllers of mobile robot agent 130A may provide control commands to servo motors that drive the wheels of the mobile robot agent 130A to navigate the mobile robot agent 130A to various locations in the environment autonomously, semi-autonomously, and/or based on control commands provided by a user via a computing device of the user. Also, for example, one or more controllers of mobile robot agent 130A may establish a network connection with pose and uncertainty system 150 via a network interface of the mobile robot agent 130A, and provide all or aspects of observations 140A to the system 150. Additional description of some examples of the structure and functionality of various robots is provided herein.

The mobile robot agent 130A may be a monitoring/observation robot that moves around an environment and collects data via the 3D laser scanner 131A and/or other sensors, but that doesn't perform any additional non-monitoring/observation tasks. The mobile robot agent 130B includes robot arms 134B1 and 134B2 with corresponding end effectors 135B1 and 135B2, that each take the form of a gripper with two opposing "fingers" or "digits." The robot arms 134B1, 134B2 and end effectors 135B1, 135B2 may be controlled autonomously, semi-autonomously, and/or based on control commands provided by a user via a computing device of a user. For example, the robot arm 134B1 may be autonomously controlled to position the end effector 135B1 proximal to an object and the end effector 135B1 may be autonomously controlled to grasp the object. Although a heterogeneous group of robots is illustrated in FIG. 1, robots in an environment may be homogenous in other implementations.

The fixed camera agent 130N may be, for example, a stereo vision camera or a machine vision camera. Other fixed sensors may be provided in some settings, such as additional and/or alternative pose vision devices. The fixed camera agent 130N may have a fixed position and/or orientation in an environment and may be calibrated with respect to a reference frame such as a so called "world frame." Accordingly, as described herein, in some implementations observations 140N that are provided by fixed camera agent 130N may each indicate a measured object pose that is relative to the reference frame.

The agents 130A-N provide corresponding observations 140A-N to the pose and uncertainty system 150 via network 103 and the pose and uncertainty system 150 generates a pose and uncertainty measure for one or more objects at a target time based on the provided observations. The agents 130A-N may provide observations 140A-N under various circumstances. For example, the mobile robot agents 130A and 130B may provide the observations 140A and 140B when they are already engaged in another task (e.g., mobile robot agent 130B may provide observations 140B as it is navigating to a location to perform a task) and/or when they are not engaged in another non-monitoring/observation task (e.g., instead of sitting idle, a robot may move throughout the environment to provide observations). As indicated by the subscript "i" provided with the observations 140A, 140B, and 140N of FIG. 1, an agent 130A, 130B, 130N will typically provide a plurality of observations over a period of time. For example, the observations 140A of mobile robot agent 130A include a plurality of observations, with each of the observations being for a different moment in time.

The observations 140A-N may each include: an observation time, a source identifier of the agent, an observed object identifier of a corresponding observed object, a measured object pose for the corresponding object, and an observation uncertainty measure for the corresponding observed object.

The observation time indicates a time at which the sensor data on which the measured object pose is based was sensed. The observation time may be based on the time at which the sensor data was sensed, or may be based on another event such as the time at which the measured object pose was generated. In some implementations, one or more (e.g., all) of the observations 140A-N may omit the observation time and the observation time may be inferred by the pose and uncertainty system 150 based on a time of receipt of the corresponding observations 140A-N.

The source identifier identifies the agent utilized to determine the measured object pose and/or the frame to which the measured object pose is relative. For example, the source identifier may be a unique identifier of a mobile robot agent utilized to determine the measured object pose and/or a unique identifier of the sensor(s) of a mobile robot agent utilized to determine the measured object pose. Also, for example, the source identifier may be a unique identifier of a mobile robot agent and may identify the frame to which the measured object pose is relative. For instance, the frame of the measured object pose may be the mobile robot agent for "robot to object" observations of the mobile robot agent, the frame of the measured object pose may be a "world frame" reference frame for some "reference frame to object" observations of the mobile robot agent, and the frame of the measured object pose may be an "odometer" reference frame for some other "reference frame to object" observations of the mobile robot agent.

The observed object identifier of an observed object may, for example, be based on a fiducial tag on the object, a radio-frequency identification (RFID) tag (passive or active) of the object, and/or feature points of the object, and may be determined by a corresponding one of the agents 130A-N based on various techniques. For example, when the identifier is based on a fiducial tag on the object (e.g., a QUICK RESPONSE (QR) code or other barcode, an alphanumeric tag), mobile robot agent 130A may determine the observed object identifier based on extracting the identifier from the fiducial tag in an image of the object captured by the mobile robot agent 130A. Also, for example, when the observed object identifier is based on a RFID tag of the object, mobile robot agent 130A may include a RFID reader that reads the RFID tag and an ID signal of the read RFID tag utilized as the observed object identifier. Also, for example, when the observed object identifier is based on feature points of the object, mobile robot agent 130A may utilize the laser scanner 131A, a camera, and/or other sensor to generate the feature points and determine the observed object identifier based on those feature points.

The measured object pose for the object may be determined by a corresponding one of the agents 130A-N based on data sensed by one or more sensors of a corresponding one of the agents 130A-N. The measured object pose may be provided as, for example, a mean pose in the SE(3) configuration space.

The observation uncertainty measure for the measured object pose may be based on, for example, uncertainty associated with the one or more sensors utilized to generate the measured object pose (e.g., type of the sensor, the model of the sensor, the error measure associated with the sensor, the most recent calibration date of the sensor, the type of pose vision device in which the sensor is implemented) and/or uncertainty associated with a distance between the measured object pose and the sensor of the agent (e.g., uncertainty may increase with increasing distance). In some implementations, the observation uncertainty measure may be provided as a probability distribution (e.g., a covariance) for the measured object pose, such as an associated Gaussian covariance measure within the 6-dimensional tangent space around a mean pose in the SE(3) configuration space.

The observations 140A-N may take various forms. For example, some observations 140A from mobile robot agent 130A may be "robot to object" observations where the observed object identifier identifies an object ((a non-agent object or an agent object (e.g., another mobile robot)), the source identifier identifies the mobile robot agent 130, and the measured object pose is relative to the pose of the robot. As another example, some observations from mobile robot agent 130A may be "reference frame to object" observations where the observed object identifier identifies the mobile robot agent 130A itself as the object, the source identifier also identifies the mobile robot agent 130A, and the measured object pose is relative to a reference frame. For instance, those observations may be based on the mobile robot agent 130A "localizing" itself using one or more localization techniques such as particle filters, landmark detection, and/or GPS. As another example, observations from fixed camera agent 130N may be "reference frame to object" observations where the observed object identifier identifies an object ((a non-agent object or an agent object (e.g., a mobile robot agent), the source identifier identifies the fixed camera agent 130N, and the measured object pose is relative to the reference frame. In some implementations, a mobile robot agent may provide multiple types of observations, with the observations of each type providing the measured object pose relative to a different frame. For example, some observations of a mobile robot agent may be "robot to object" observations with an object pose that is relative to the pose of the mobile robot agent, some observations may be "reference frame to robot" observations where the measured object pose is relative to a first frame (e.g., a "world frame" reference frame), and some observations maybe "reference frame to robot" observations where the measured object pose is relative to a second frame (e.g., an "odometer" reference frame). In some of those implementations, the source identifier of each of the observations may indicate the corresponding frame to which the measured object pose is relative.

Pose and uncertainty system 150 may include one or computing systems connected by one or more networks (not depicted) and may use observations 140A-N to generate a pose and uncertainty measure of an object 101 at a target time, and optionally pose and uncertainty measures for additional objects at the target time. An example of such a computing system is depicted schematically in FIG. 8. Various modules or engines may be implemented as part of pose and uncertainty system 150 as software, hardware, or any combination of the two. For example, in FIG. 1 system 150 includes an observations identification engine 152, a multigraph generation engine 154, a composite pose and uncertainty generation engine 156, and a merging engine 158.

The observations identification engine 152 is configured to identify a group of the observations 140A-N for a target time based on the observation times of the observations of the group satisfying a threshold relative to the target time. The target time may be, for example, a "current time" or an earlier time such as "1 hour ago", "yesterday at 2:30 PM", etc. For example, one or more observations 140A-N for each of a plurality of unique "source identifier" (e.g., identifier of the agent and/or identifier of the reference frame to which the measured object pose is relative), "observed object identifier" pairs that have observation times that are within a threshold amount of time of the target time may be selected. For instance, the two observations for each "source identifier", "observed object identifier" pair that are nearest in time to the target time (and that also satisfy the threshold) may be selected if two observations that satisfy the threshold are available. Otherwise, one nearest in time observation that satisfies the threshold may be selected or no observation may be selected.

As one specific example, assume a target time is the "current time" and the threshold is "within one second of the target time." Further assume that a first set of five observations that have a source identifier of "mobile robot agent 130A", an observed object identifier of "Object A", and an observation time within one second of the target time have been provided to the pose and uncertainty system 150 (or provided to a database accessible by system 150). The observations identification engine 152 may select the two observations from the first set of five observations that are closest in time to the current time as members of the group. Further assume that a second set of six observations that have a source identifier of "mobile robot agent 130A", an observed object identifier of "Object B", and an observation time within one second of the target time have been provided to the pose and uncertainty system 150. The observations identification engine 152 may select the two observations from the second set of six observations that are closest in time to the current time as members of the group. Further assume that a third set of one observation that has a source identifier of "Agent B", an observed object identifier of "mobile robot agent 130B", and an observation time within one second of the target time has been provided to the pose and uncertainty system 150. The observations identification engine 152 may select that observation as a member of the group, or may not select that observation in other implementations (e.g., where two or more observations that satisfy the threshold must be present for a "source identifier", "observed object identifier" pair for those observations to be included in the group). The observations identification engine 152 may repeat this process for observations 140A-N with additional "source identifier", "observed object identifier" pairs to form the group of observations.

In some implementations, the observations identification engine 152 may identify the group of observations for the target time from a multigraph that includes additional observations that are not selected for inclusion in the group. For example, the multigraph may include the last X number of received observations 140A-N or all observations 140A-N received for a most recent time period, such as the last hour. Such a multigraph may have a structure similar to that discussed below with respect to FIG. 3 and the observations identification engine 152 may select the group by selecting, for each of a plurality of unique "source identifier", "observed object identifier" pairs, one or more edges of the multigraph that have observation times that are within a threshold amount of time of the target time and that are closest in time to the target time.

The multigraph generation engine 154 is configured to generate a multigraph based on the group of observations identified by observations identification engine 152. In implementations where the observations identification engine 152 identifies the group of observations for the target time from a multigraph that includes additional observations that are not selected for inclusion in the group, generating the multigraph based on the group may comprise generating a reduced multigraph from the multigraph used by engine 152.

The multigraph generated by multigraph generation engine 154 includes object nodes defining the objects (non-agent objects and agent objects) of the group and a reference frame node defining a reference frame such as a so-called "world frame." The multigraph further includes edges between the nodes, with each of the edges being defined based on an observation of the group. For example, a first edge may be defined between an object node that defines a mobile robot agent and an object node that defines a non-agent object based on an observation that includes an observed object identifier associated with the non-agent object node and a source identifier associated with the mobile robot agent. The first edge further defines the measured object pose and the observation uncertainty measure for the observation.

Figure 2:
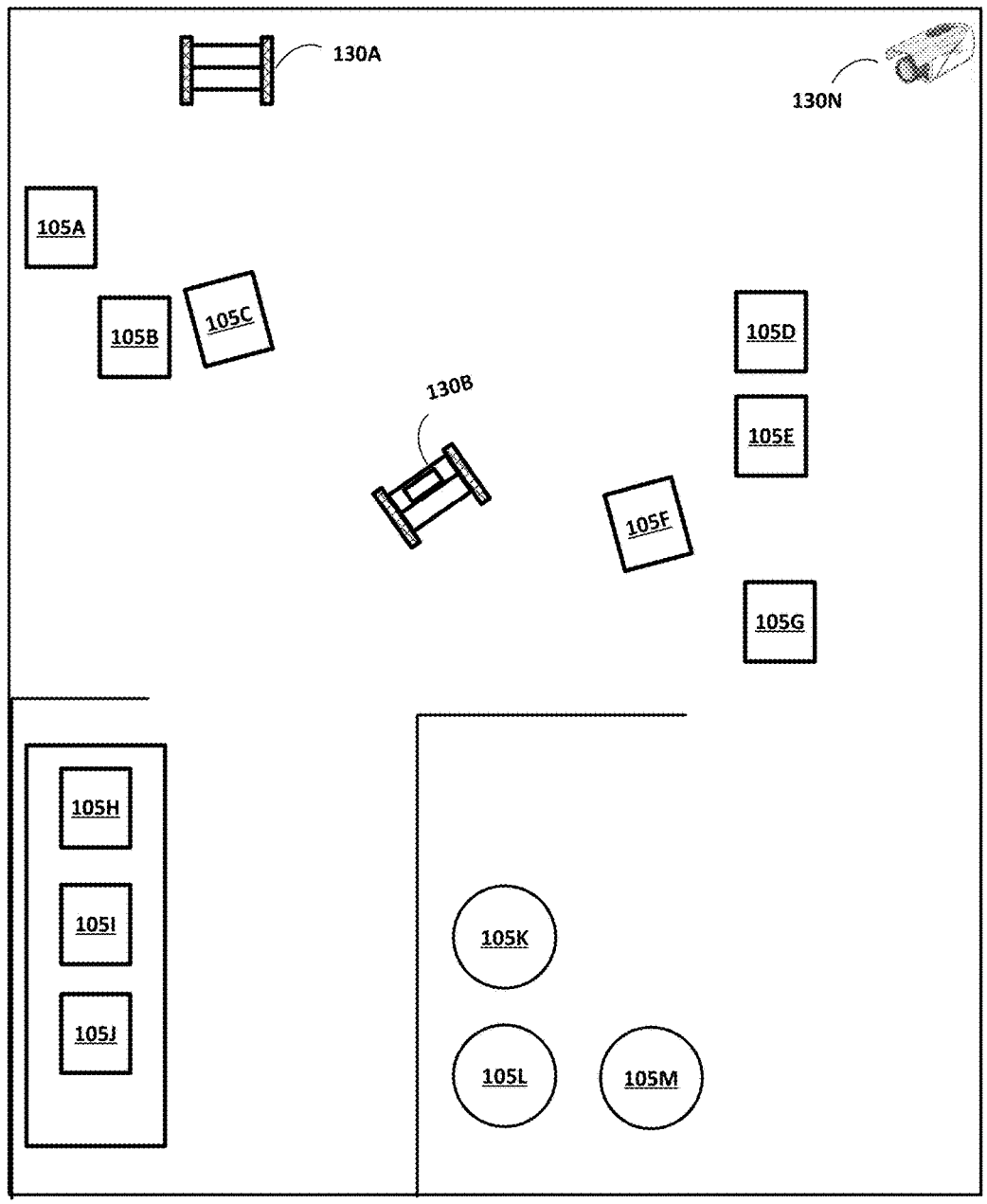
FIG. 2 illustrates a plan view of a portion of a building, with agents from FIG. 1 in the building and with additional objects in the building.
Figure 3:
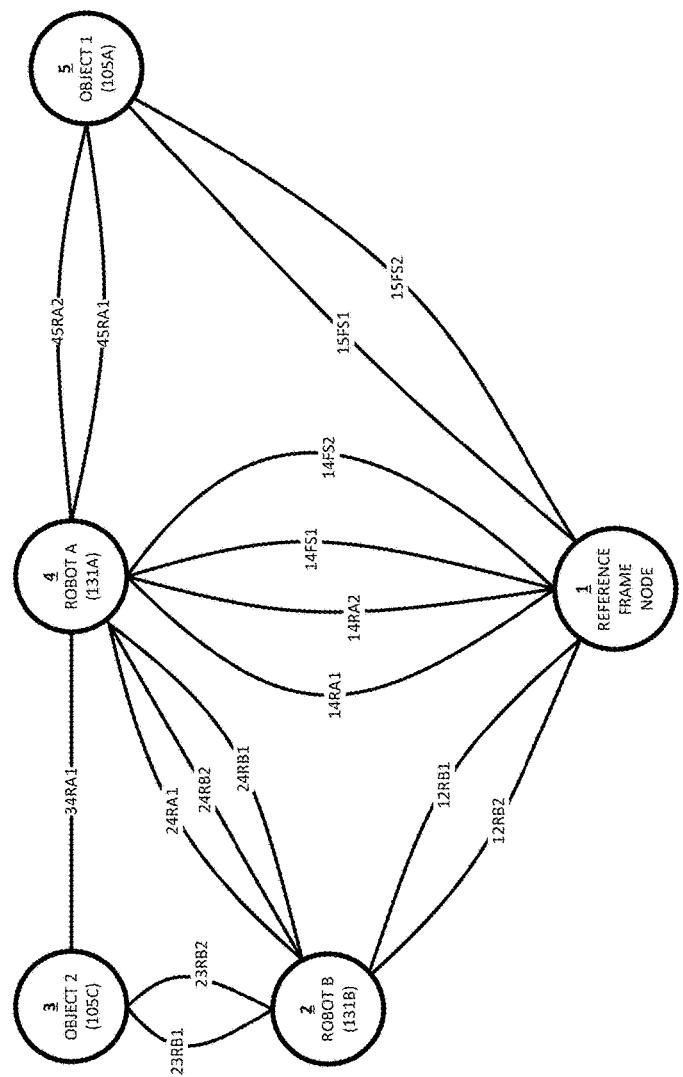
FIG. 3 illustrates a portion of a multigraph that may be generated based on a group of observations from the agents of FIG. 2.

With reference to FIGS. 2 and 3, one example of a multigraph that may be generated by engine 154 is described. FIG. 2 illustrates a plan view of a portion of a building at a first time, with agents 130A, 130B, and 130N from FIG. 1 in the building and with additional objects 105A-M also in the building. The objects 105A-J may be, for example, boxes, pallets, and/or other objects. The objects 105K-M may be, for example, drums, barrels, and/or other objects. At the poses of the agents 130A, 130B, and 130N and the objects 105A-N as depicted in FIG. 2, each of one or more of the agents 130A, 130B, and 130N may provide corresponding observations that include a measured object pose for one or more of the objects 105A-M or one or more of the agents 130A, 130B, 130N.

For example, fixed camera agent 130N is in a fixed position in the environment and may generate one or more observations having an object identifier of mobile robot agent 130A, mobile robot agent 130B, and/or one or more objects 105A-G when they are in the respective poses depicted in FIG. 2. Also, for example, the fixed camera agent 130N may generate one or more observations at earlier or future periods of time when mobile robot agent 130A, mobile robot agent 130B, and/or one or more objects 105A-M have different poses. The mobile robot agents 130A and 130B may capture one or more observations in their illustrated positions and at one or more earlier and/or future timer periods as they and/or other objects move throughout the environment.

FIG. 3 presents a portion of a multigraph that may be generated based on a group of observations provided by the agents 130A, 130B, 130N, where the group of observations is identified based on a target time that is near the first time illustrated in FIG. 2. The multigraph includes object nodes 2, 3, 4, and 5, and a reference frame node 1. The object node 3 and 5 correspond to non-agent objects and the object nodes 2 and 4 correspond to mobile robot agent objects. In particular, as indicated in FIG. 3, object nodes 3 and 5 correspond to respective of objects 105C and 105A in FIG. 2 and object nodes 2 and 4 correspond to respective of mobile robot agent 131B and mobile robot agent 131A.

The edges between the nodes 1-5 are labeled with alphanumeric labels. The starting numeric characters of the labels indicate the two nodes that they connect. For example, edge 23RB1 connects nodes 2 and 3. The alphabetic characters of the labels indicate the source of the observation on which the edge is based. In particular, the alphabetic characters RA indicate the source is mobile robot agent 131A, the alphabetic characters RB indicate the source is mobile robot agent 131B, the alphabetic characters FS indicate the source is fixed camera agent 131N. The ending numeric character disambiguates between edges that are based on multiple distinct in time observations having the same "source identifier", "observed object identifier" pair. For example, edges 23RB1 and 23RB2 are both based on a corresponding observation with a source identifier corresponding to mobile robot agent 131B (as indicated by "RB") and to an observed object identifier corresponding to object 105C (as indicated by the edges connecting to node 3).

In the multigraph depicted in FIG. 1, "robot to object" observations are represented by the edges 23RB1, 23RB2, 24RA1, 24RB1, 24RB2, 34RA1, 45RA1, and 45RA2. "Reference frame to object" observations that are based on "robot localization" are represented by the observations 12RB1, 12RB2, 14RA1, and 14RA2. "Reference frame to object" observations from fixed camera sensor 130N are represented by edges 14F51, 14F52, 15F51, and 15F52.

In the multigraph of FIG. 3, the edges are all based on observations of a group identified by observations identification engine 152. It is understood that the multigraph of FIG. 3 may have additional nodes and/or edges. However, only a portion of the multigraph is depicted in FIG. 3 for the sake of simplicity.

In some implementations, in generating a multigraph based on a group of observations, multigraph generation engine 154 may combine measured object poses and observation uncertainty measures from two or more observations that have the same object identifier and the same source identifier (i.e., observations with the same "object identifier", "source identifier" pair). The combined object pose and observation uncertainty measure may be used to define a single edge in lieu of two or more separate edges based on the two or more observations. For example, a version of spherical linear interpolation (SLERP) generalized to the SE(3) configuration space may be used to interpolate between two measured object poses and observation uncertainty measures and the interpolation used to define the object pose and observation uncertainty measure of a single edge.

Figure 4:
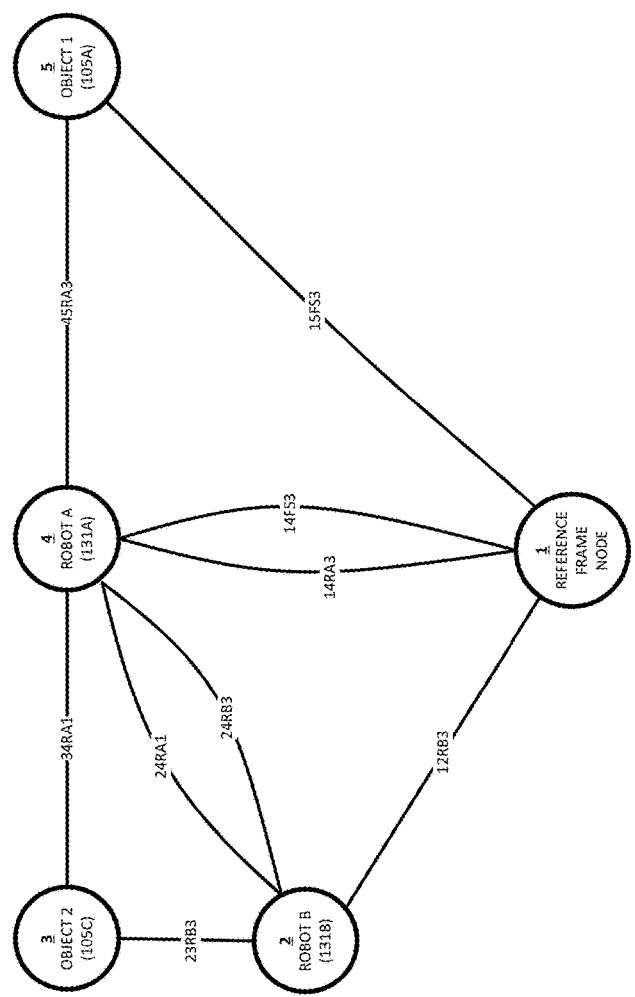
FIG. 4 illustrates a portion of another multigraph that may be generated based on a group of observations from the agents of FIG. 2, where various edges of the multigraph are based on combining measured object poses and observation uncertainty measures of two observations that have the same object identifier and the same source identifier.

A portion of one example multigraph that combines two or more measured object poses and observation uncertainty measures from two observations that have the same object identifier and the same source identifier is illustrated in FIG. 4. The multigraph of FIG. 4 may be generated based on a group of observations from the agents of FIG. 2.

The portion of the multigraph of FIG. 4 the same as the portion of the multigraph depicted in FIG. 3, but combines any two edges having the same "source identifier", "observed object identifier" pair into a single edge. Those combined edges are denoted with an ending numeric character of "3" to reflect that they are combinations of two distinct observations. In particular: edge 12RB3 is defined in FIG. 4 in lieu of the edges 12RB1 and 12RB2 of FIG. 3; edge 23RB3 is defined in FIG. 4 in lieu of the edges 23RB1 and 23RB2 of FIG. 3; edge 24RB3 is defined in FIG. 4 in lieu of the edges 24RB1 and 24RB2 of FIG. 3; edge 14RA3 is defined in FIG. 4 in lieu of the edges 14RA1 and 14RA2 of FIG. 3; edge 14FS3 is defined in FIG. 4 in lieu of the edges 14FS1 and 14FS2 of FIG. 3; edge 15FS3 is defined in FIG. 4 in lieu of the edges 15FS1 and 15FS2 of FIG. 3; and edge 45RA3 is defined in FIG. 4 in lieu of the edges 45RA1 and 45RA2 of FIG. 3.

It is noted in FIGS. 3 and 4 that the edges 34RA1 and 24RA1 represent edges based on a single observation (e.g., no other observations for the same "object identifier", "source identifier" pair that satisfied the threshold were in the group). In some implementations, edges 34RA1 and 24RA1 may optionally be omitted from a generated multigraph.

In some implementations, the multigraph of FIG. 4 may be generated from the multigraph of FIG. 3. In some implementations, the multigraph of FIG. 4 may be generated from another multigraph such as a multigraph that also includes observations that are not identified by engine 152 for inclusion in the group. In some implementations, the multigraph of FIG. 4 may be generated from the observations directly.

Composite pose and uncertainty generation engine 156 is configured to, for each of one or more target nodes of a multigraph, generate a composite pose and composite uncertainty measure for each of a plurality of simple paths along the edges that connect the reference frame node and the target node. A simple path of a multigraph is a path that does not have any repeating vertices. For example, assume object node 3 of the multigraph of FIG. 4 is the target node. There are twelve separate simple paths from reference frame node 1 and object node 3. Those twelve separate simple paths are illustrated in FIGS. 5A-5L.

Figure 5A:
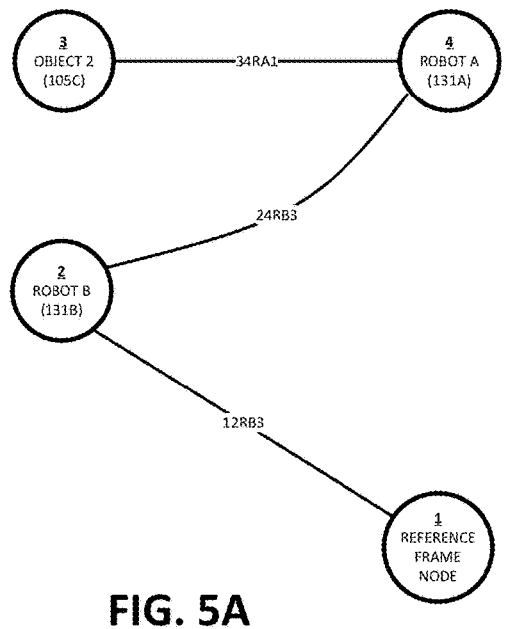
FIGS. 5A-5L illustrate simple paths between a reference frame node of the multigraph of FIG. 4 and an object node of the multigraph of FIGS. 4.
Figure 5B:
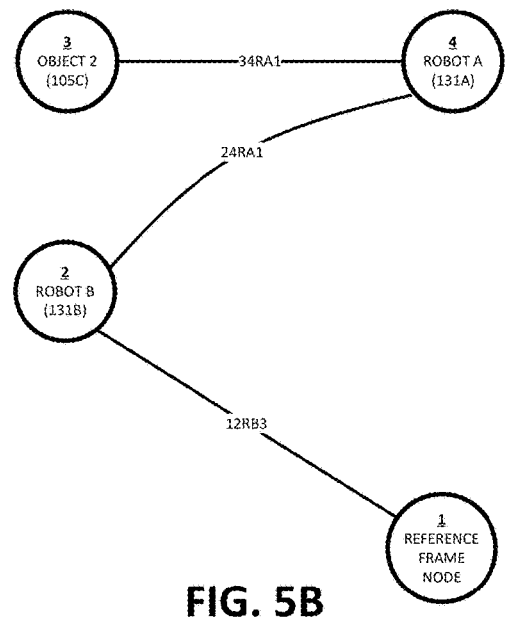
Figure 5C:
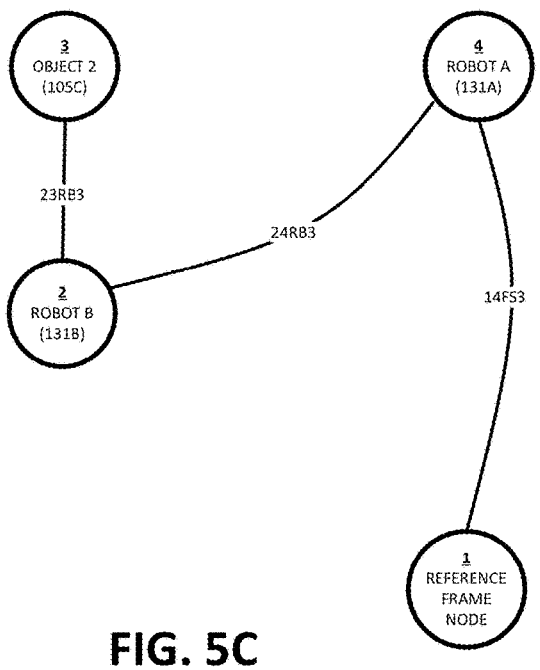
Figure 5D:
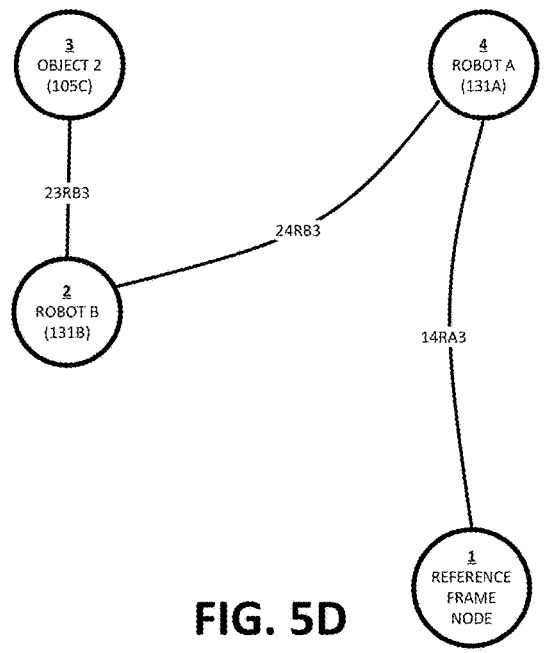
Figure 5E:
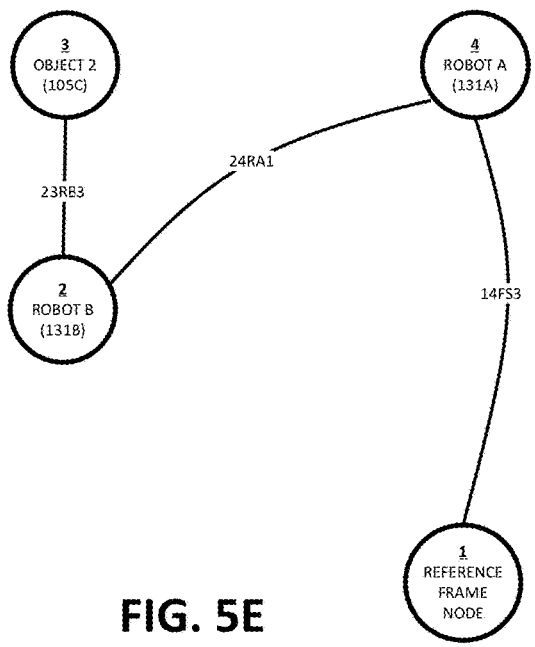
Figure 5F:
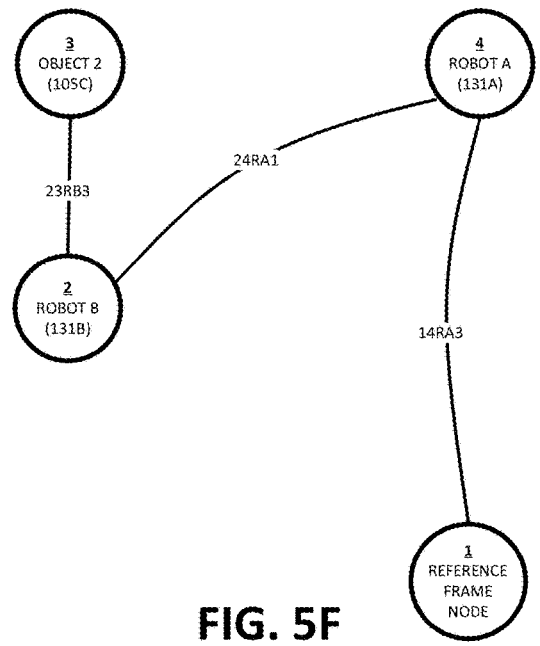
Figure 5G:
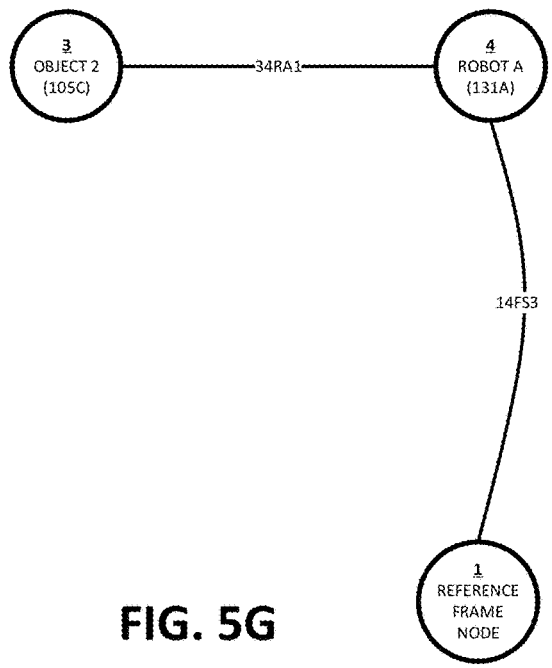
Figure 5H:
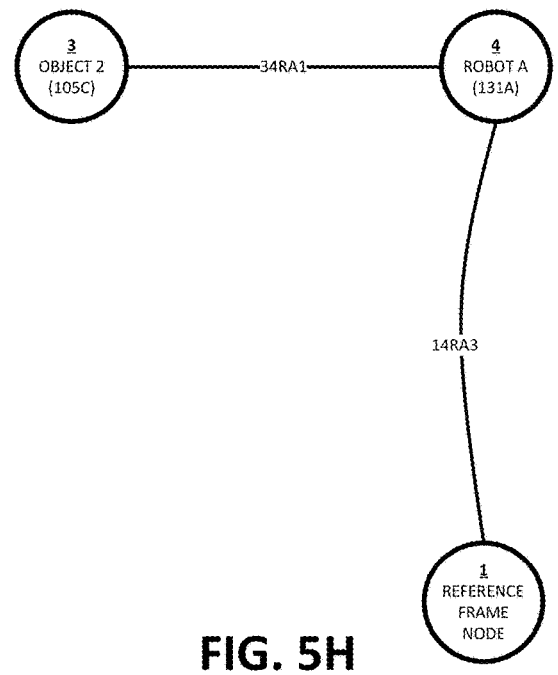
Figure 5I:
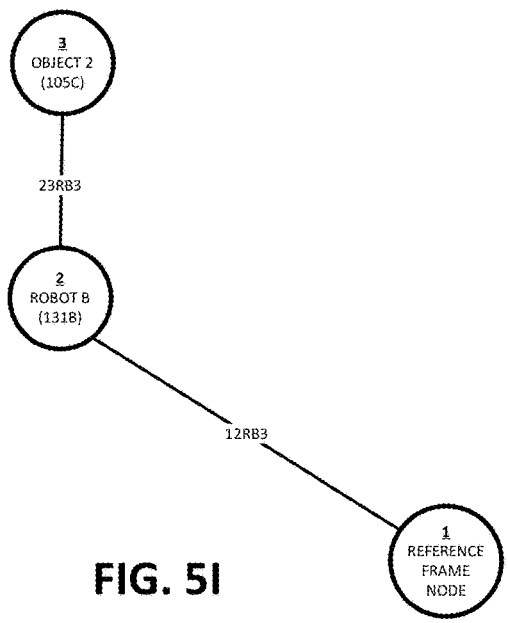
Figure 5J:
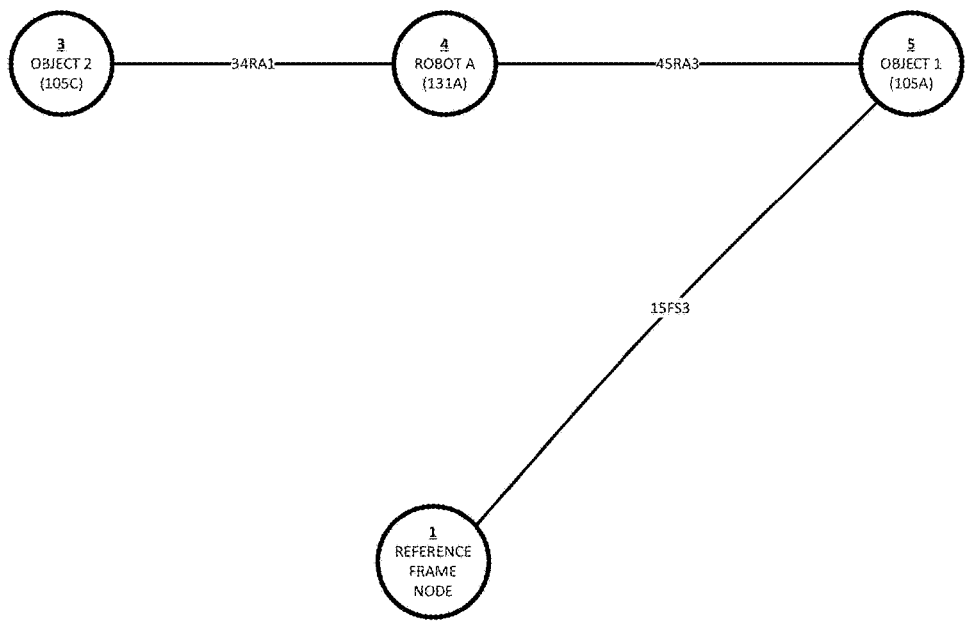
Figure 5K:
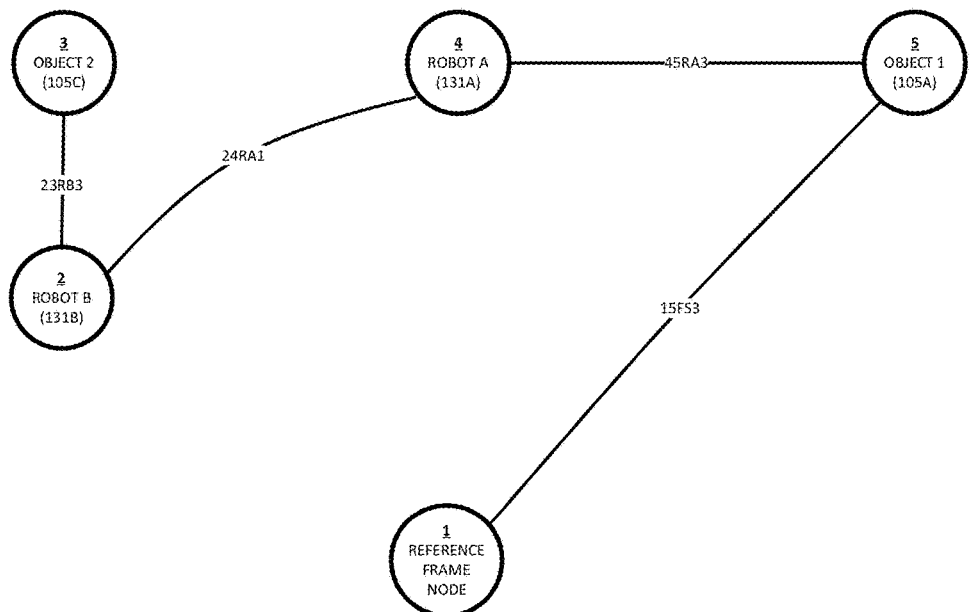
Figure 5L:
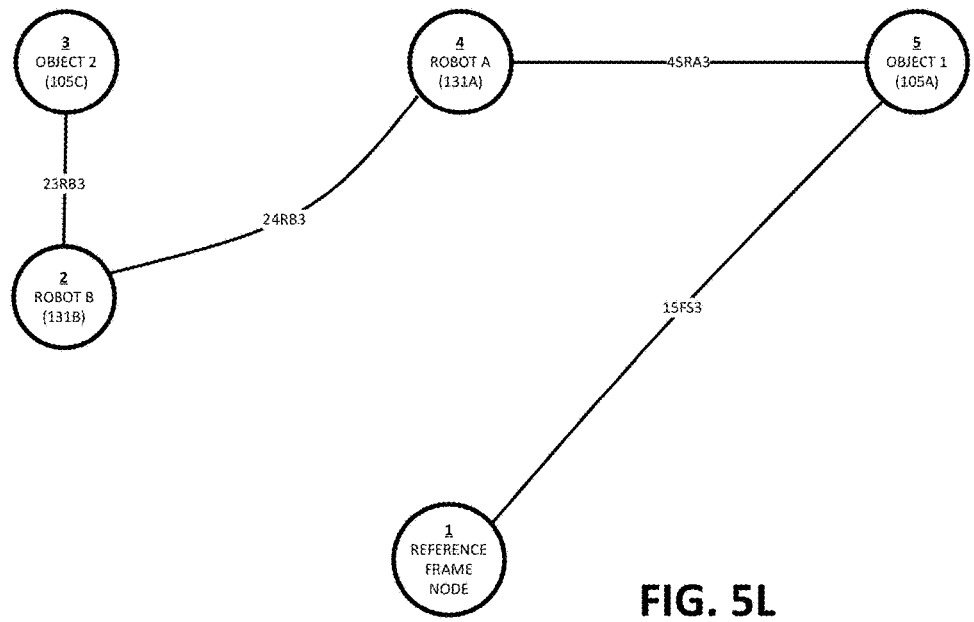

In some implementations, engine 156 generates a composite pose and composite uncertainty measure for all simple paths between the reference frame node and the target node. In some implementations, the number of simple paths identified can be reduced by, for example, only looking at simple paths whose edges are all associated with less than a threshold number of observation sources and/or only looking at simple paths with less than a threshold number of edges. For example, some implementations may only look at simple paths whose edges are associated with a corresponding single observation source. For instance, the simple paths of FIG. 5H and 5I are both associated with a single observation source (respective of agents 131A ("RA") and 131B ("RB"))—and one or both of the simple paths of FIG. 5H and 5I may be the only simple paths considered. On the other hand, the simple paths of FIGS. 5A-G and 5J-L are all associated with two or more observation sources.

In some implementations, the number of simple paths identified can be reduced by merging multiple edges between nodes. For example, in FIG. 4 edges 14RA3 and 14FS3 may be merged into a single edge using co-variance weighted averaging and/or other data fusion methods to reduce the number of simple paths. In some implementations, the composite pose and uncertainty generation engine 156 may first determine the number of simple paths, and when the number of simple paths is greater than a threshold may reduce (based on one or more criteria) the number of simple paths for which composite poses and uncertainty measures are calculated. In some implementations, composite pose and uncertainty generation engine 156 may reduce the number of paths to achieve a desired execution time (e.g., to provide results more quickly).

For each identified simple path between a target node and a reference node, engine 156 generates a composite pose relative to the reference frame node and a composite uncertainty measure for the composite pose by chaining together the poses and the uncertainty measures defined for the edges that make up the simple path. For example, engine 154 may generate a composite pose and uncertainty measure for the simple path of FIG. 5A by chaining together the pose and uncertainty measures defined for edges 12RB3, 24RB3, and 34RA1. In some implementations, because transforms in SE(3) configuration space are nonlinear, the composite uncertainty measure can be approximated using an unscented transform (UT) and/or other nonlinear covariance estimation techniques such as Taylor series approximations.

Merging engine 158 is configured to, for each of one or more target nodes of a multigraph, determine a pose and uncertainty measure for the target node at the target time based on the composite poses and the composite uncertainty measures of the simple paths determined by engine 156. For example, the composite poses and the composite uncertainty measures generated by engine 156 for a plurality of simple paths between a reference node and a target node may be provided to merging engine 158. Merging engine 158 can merge the composite poses and composite uncertainty measures to generate a pose and uncertainty measure for the target node. For example, the merging engine 158 may merge the composite poses and composite uncertainty measures using covariance-weighted averaging and/or other data fusion techniques.

The merging engine 158 may assign the generated pose and uncertainty measure for the target node at the target time to the object identifier on which the target node is based. For example, where the target node is node 3 of FIG. 4 and the target time is the "current time", the merging engine 158 may assign the generated pose and uncertainty measure as the "current" pose and uncertainty for an object identifier associated with object 105C.

The pose and uncertainty measure of object 101 generated by engine 158 may be utilized for various purposes. For example, pose and uncertainty measure of object 101 may be provided, by the pose and uncertainty system 150, to one or more components via network 103. For example, the pose and uncertainty of object 101 may be provided to mobile robotic agents 130A and 130B (or a control system controlling aspects of those agents) to influence one or more tasks to be performed by the robotic agents 130A and 130B. For example, the pose and uncertainty of an object 101 may influence a path that robot 130B takes (e.g., to avoid the object or to navigate to the object), may influence control commands generated by the robot 130B to interact with the object (e.g., to position itself relative to the object based on the pose), and/or may influence whether the robot 130B travels toward the object to generate one or more additional observations of the object (e.g., if the uncertainty measure is indicative of relatively high uncertainty, it may indicate a need for additional observations to reduce the uncertainty). In some implementations, the pose and uncertainty measure of an object 101 may be provided to a logistics system that may utilize the information for inventory tracking, process analysis, process improvement, tracking the pose history of a particular object over time, etc.

While agents 130A-N and system 150 are depicted separately in FIG. 1, this is not meant to be limiting. In various implementations, one or more aspects of pose and uncertainty system 150 may be implemented on one or more of the agents 130A-N. For example, all or aspects of one or more of the engines 152, 154, 156, and/or 158 may be distributed across multiple of the agents 130A-N. In implementations where the agents 130A-N and system 150 are separate components, they may communicate over one or more wired or wireless networks or using other wireless technology, such as radio, Bluetooth, infrared, etc.

Figure 6:
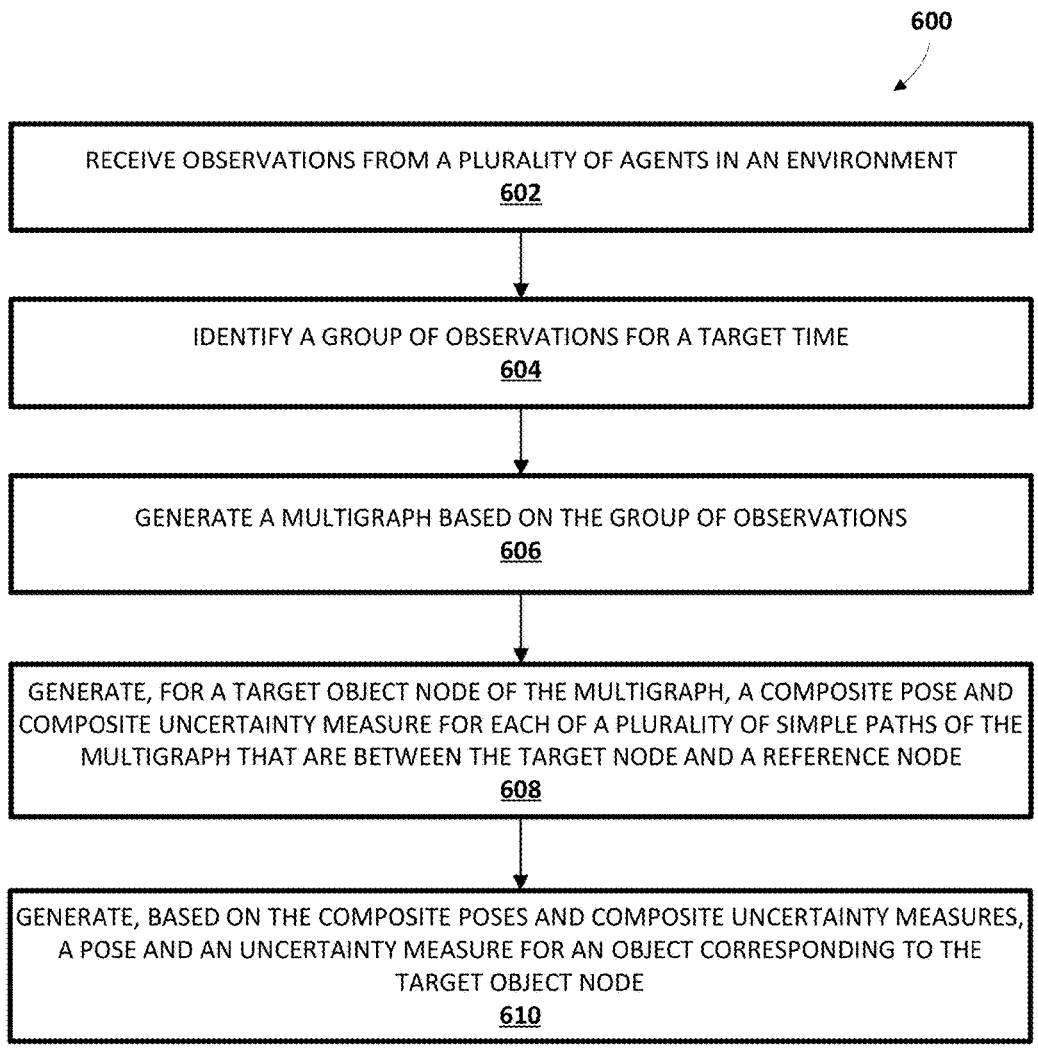
FIG. 6 depicts a flow chart illustrating an example method of using observations from multiple agents in an environment to estimate the pose of an object in the environment at a target time and to estimate an uncertainty measure for that pose.

FIG. 6 depicts a flow chart illustrating an example method 600 of using observations from multiple agents in an environment to estimate the pose of an object in the environment at a target time and to estimate an uncertainty measure for that pose. For convenience, the operations of the flow chart are described with reference to a system that performs the operations. This system may include various components of various computer systems, such as pose and uncertainty system 150 of FIG. 1. Moreover, while operations of method 600 are shown in a particular order, this is not meant to be limiting. One or more operations may be reordered, omitted or added.

At block 602, the system receives observations from a plurality of agents in an environment. For example, the system may receive observations from mobile robotic agents, fixed sensor agents, and/or other agents. The system may receive the observations directly and/or via one or more databases that store observations provided by the agents. The observations are each generated based on sensor data from one or more sensors of a corresponding agent.

At block 604, the system identifies a group of observations for a target time. The system identifies the group based on the observation times of the observations of the group satisfying a threshold relative to the target time. The target time may be, for example, a "current time" or an earlier time such as "1 hour ago", "yesterday at 2:30 PM", etc. In some implementations, the system may select, for inclusion in the group, a plurality of observations for each of a plurality of unique "source identifier", "observed object identifier" pairs that have observation times that are within a threshold amount of time of the target time. For example, the two observations for each "source identifier", "observed object identifier" pair that are nearest in time to the target time (and that also satisfy the threshold) may be selected if two observations that satisfy the threshold are available. In some implementations, the system may identify the group of observations for the target time from a multigraph that includes additional observations that are not selected for inclusion in the group.

At block 606, the system generates a multigraph based on the group of observations identified at block 604. The multigraph generated by the system includes object nodes defining the objects (non-agent objects and agent objects) of the group and a reference frame node defining a reference frame such as a so-called "world frame." The multigraph further includes edges between the nodes, with each of the edges being defined based on an observation of the group. For example, a first edge may be defined between an object node that defines a mobile robot agent and an object node that defines a non-agent object based on an observation that includes an observed object identifier associated with the non-agent object node and a source identifier associated with the mobile robot agent. The first edge further defines the measured object pose and the observation uncertainty measure for the observation.

In some implementations, in generating a multigraph based on a group of observations, the system may combine measured object poses and observation uncertainty measures from two or more observations that have the same object identifier and the same source identifier (i.e., observations with the same "object identifier", "source identifier" pair). The combined object pose and observation uncertainty measure may be used to define a single edge in lieu of two or more separate edges based on the two or more observations. For example, a version of spherical linear interpolation (SLERP) generalized to the SE(3) configuration space may be used to interpolate between two observations and the interpolation used to define a single edge in lieu of two separate edges based on the two observations.

At block 608, the system generates, for a target object node of the multigraph, a composite pose and composite uncertainty measure for each of a plurality of simple paths of the multigraph that are between the target node and a reference node. For example, the system may generate the composite pose and composite uncertainty measure for a simple path by using an unscented transform (UT) and/or other nonlinear covariance estimation techniques to chain together the poses and uncertainty measures defined for the edges that make up the simple path. In some implementations, the system generates a composite pose and composite uncertainty measure for all simple paths between the reference frame node and the target node. In some implementations, the system may generate a composite pose and composite uncertainty measure for less than all simple paths, such as only simple paths whose edges are all associated with less than a threshold number of observation sources and/or simple paths with less than a threshold number of edges.

At block 610, the system generates, based on the composite poses and the composite uncertainty measures generated at block 608, a pose and an uncertainty measure for an object corresponding to the target object node. For example, the system may merge the composite poses and composite uncertainty measures using covariance-weighted averaging and/or other data fusion techniques. The system may assign the generated pose and uncertainty measure for the target node at the target time to the object identifier on which the target node is based. The system may provide the generated pose and uncertainty measure for the target node at the target time to one or more components such as a robot, a robot control system, and/or a logistics system.

Figure 7:
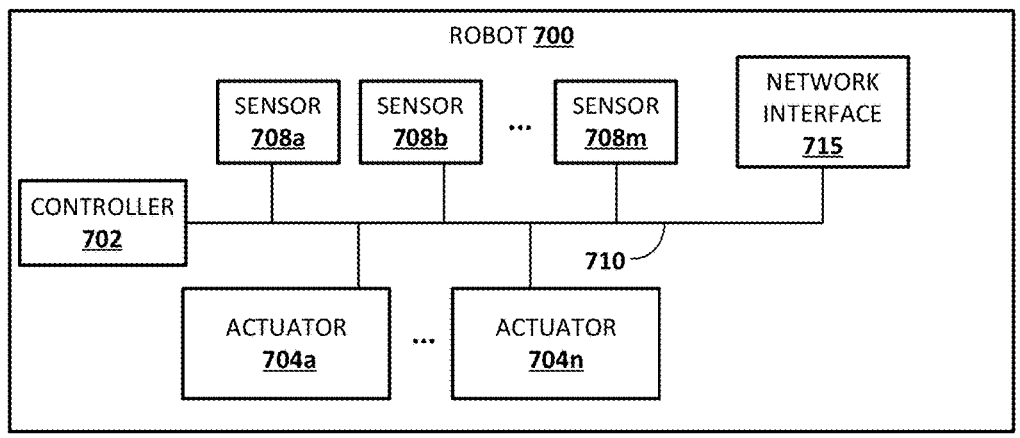
FIG. 7 schematically depicts an example architecture of a robot.

FIG. 7 schematically depicts an example architecture of a robot that may be used as a robotic agent described herein. Robot 700 may take various forms, including but not limited to a telepresence robot, a humanoid form, an animal form, a wheeled device, a submersible vehicle, an unmanned aerial vehicle ("UAV"), and so forth. In various implementations, robot 700 may include a controller 702. Controller 702 may take various forms, such as one or more processors, one or more field-programmable gate arrays ("FPGA"), one or more application-specific integrated circuits ("ASIC"), one or more so-called "real time controllers," and so forth.

In various implementations, controller 702 may be operably coupled with one or more actuators 704a-n and/or one or more sensors 708a-m, e.g., via one or more buses 710. Sensors 708a-m may take various forms, including but not limited to 3D sensors, cameras, depth sensors, light sensors, pressure sensors, pressure wave sensors (e.g., microphones), proximity sensors, accelerometers, gyroscopes, thermometers, barometers, and so forth. While sensors 708a-m are depicted as being integral with robot 700, this is not meant to be limiting. In some implementations, one or more sensors 708a-m may be located external to robot 700, e.g., as standalone units.

Controller 702 may provide control commands to the actuators 704a-n to accomplish one or more tasks. Those control commands include commands that direct the actuators 704a-n to drive wheels and/or other components to enable the robot 700 to traverse one or more paths autonomously, semi-autonomously, and/or in response to control commands provided by a computing device in response to user interface input at the computing device. Controller 702 may further provide control commands to generate all or aspects of observations described herein, receive and act upon one or more poses and/or uncertainty measures for objects determined based on techniques described herein, and/or receive and act upon control commands such as those generated based at least in part on one or more poses and/or uncertainty measures for objects determined based on techniques described herein. Also, for example, controller 702 may establish a network connection with pose and uncertainty system 150 via network interface subsystem 715 and provide all or aspects of observations to the system 150.

Network interface subsystem 715 provides an interface to outside networks and is coupled to one or more corresponding interface devices in one or more other computer systems such as a computing device engaged in a session with the robot. In some implementations, robot 700 may incorporate, in addition to other components, one or more aspects of a computer system, such as computer system 810 described below.

Figure 8:
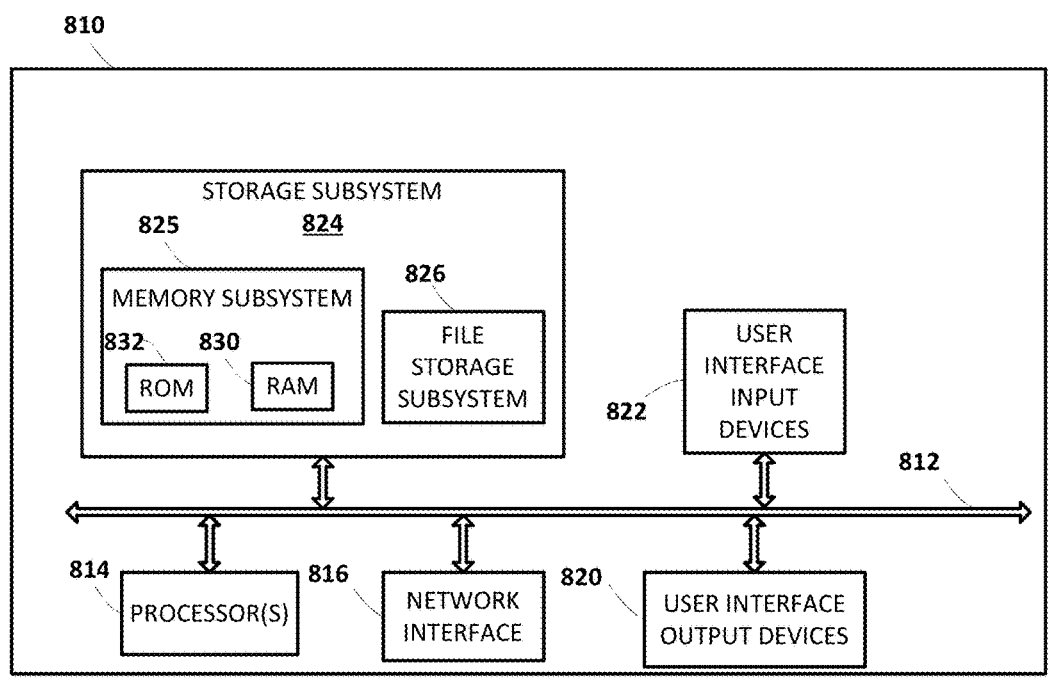
FIG. 8 schematically depicts an example architecture of a computer system.

FIG. 8 is a block diagram of an example computer system 810. Computer system 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computer system 810. Network interface subsystem 816 provides an interface to outside networks and is coupled to corresponding interface devices in other computer systems.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules described herein. For example, the storage subsystem 824 may include the logic to perform selected aspects of method 600 and/or to implement one or more aspects of controller 702, engine 152, engine 154, engine 156, and/or engine 158. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a CD-ROM drive, an optical drive, or removable media cartridges. Modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computer system 810 communicate with each other as intended. Although bus subsystem 812 is shown schematically as a single bus, alternative implementations of the bus subsystem may use multiple busses.

Computer system 810 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 810 depicted in FIG. 8 is intended only as a specific example for purposes of illustrating some implementations. Many other configurations of computer system 810 are possible having more or fewer components than the computer system depicted in FIG. 8.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
receiving a plurality of observations from a plurality of agents in an environment, each of the observations generated based on sensor data from one or more sensors of a corresponding agent of the agents and including:
an observation time, a source identifier of the corresponding agent, an observed object identifier of a corresponding observed object of multiple objects of the environment, a measured object pose for the corresponding observed object, and an observation uncertainty measure for the measured object pose;
identifying a group of the observations for a target time based on the observation times of the observations of the group satisfying a threshold relative to the target time;
generating, based on the group of observations, a multi-graph having a plurality of nodes and edges connecting the nodes, the generating comprising defining a reference frame node of the nodes, defining object nodes of the nodes that are based on the observed object identifiers of the group, and generating the edges connecting the nodes based on the observed object identifiers, the source identifiers, and the measured object poses and observation uncertainty measures of the group,
wherein generating each of the edges comprises:
connecting the edge with a respective pair of nodes,
determining an edge measured object pose based on at least one of one or more of the measured object poses corresponding to the respective pair of nodes, and determining an edge object uncertainty measure based on at least one of one or more of the object uncertainty measures corresponding to the respective pair of the nodes, and wherein generating the multigraph comprises:

generating a first set of multiple of the edges, wherein the first set of the edges define a first simple path that connects the reference frame node and a given object node of the object nodes, the first set of the edges comprising a first set first edge that connects the given object node to a first object node, and a first set second edge that connects the first object node to a second object node or to the reference frame node, and generating a second set of multiple of the edges that define a second simple path that connects the reference frame node and the given object node, the second set of edges comprising a second set first edge that is in addition to the edges of the first set of the edges that define the first simple path;

generating a composite pose and composite uncertainty measure for each of a plurality of simple paths along the edges that connect the reference frame node and the given object node of the object nodes, including the first simple path and the second simple path, wherein the composite pose and the composite uncertainty measure for each of the simple paths is based on the edge measured object pose and the edge observation uncertainty measure for each of the edges of the simple path;

generating, based on the composite poses and the composite uncertainty measures, a pose and an uncertainty measure for the object identifier on which the given object node is based;

assigning the pose and the uncertainty measure to the object identifier on which the given object node is based; and providing the object identifier, the pose, and the uncertainty measure to at least one robotic agent, of the agents in the environment, to influence control commands generated by the robotic agent.

2. The computer-implemented method of claim 1, wherein at least one of the observed object identifiers of the observations identifies one of the agents of the environment.

3. The computer-implemented method of claim 1, wherein the object identifier on which the given object node is based identifies a robotic agent of the agents of the environment.

4. The computer-implemented method of claim 1, wherein:

the observed object identifier of a first observation identifies a mobile robot agent of the agents and the source identifier of the first observation identifies the mobile robot agent; and the observed object identifier of a second observation identifies a non-agent object of the agents and the source identifier of the second observation identifies the mobile robot agent.

5. The computer-implemented method of claim 4, wherein:

the observed object identifier of a third observation identifies the non-agent object of the agents and the source identifier of the third observation identifies a fixed sensor agent of the agents.

6. The computer-implemented method of claim 1, wherein generating the pose and the uncertainty measure based on the composite pose and the composite uncertainty measure comprises:

merging the composite poses and the composite uncertainty measures for the plurality of simple paths.

7. The computer-implemented method of claim 6, wherein merging the composite poses and the composite uncertainty measures for the plurality of simple paths comprises weighting, in the merging, the composite poses and the composite uncertainty measures based on the composite uncertainty measures.

8. The computer-implemented method of claim 1, wherein generating an edge of the edges along a simple path of the simple paths comprises:

generating the edge measured object pose and the edge observation uncertainty measure for the edge based on spherical linear interpolation of the edge measured object pose and the edge observation uncertainty measure of a first observation of the observations of the group and the edge measured object pose and the edge observation uncertainty measure of a second observation of the observations of the group, wherein the first observation and the second observation both identify the same observed object identifier and the same source identifier.

9. The computer-implemented method of claim 1, wherein generating the composite pose and the composite uncertainty measure for each of the plurality of simple paths comprises applying an unscented transform to the edge measured object poses and the edge observation uncertainty measures for the edges of the simple path.

10. The computer-implemented method of claim 1, wherein the first set second edge connects the first object node to the second object node, and wherein the first set of the edges further comprise a first set third edge that connects the second object node to a third object node or to the reference frame node.

11. A system comprising:

a pose and uncertainty system comprising one or more computing systems;

a plurality of agents in an environment providing sensor-based observations to the pose and uncertainty system over a period of time, wherein each of the observations is generated based on sensor data from one or more sensors of a corresponding agent of the agents and includes:

an observation time, a source identifier of the corresponding agent, an observed object identifier of a corresponding observed object of multiple objects of the environment, a measured object pose for the corresponding observed object, and an observation uncertainty measure for the measured object pose;

wherein the pose and uncertainty system comprises instructions that, when executed by the one or more computing systems, cause the computing systems to:

identify a group of the observations for a target time based on the observation times of the observations of the group satisfying a threshold relative to the target time;

generate, based on the group of observations, a multigraph having a plurality of nodes and edges connecting the nodes, the generating comprising defining a reference frame node of the nodes, defining object nodes of the nodes that are based on the observed object identifiers of the group, and generating the edges connecting the nodes based on the observed object identifiers, the source identifiers, and the measured object poses and observation uncertainty measures of the group, wherein in generating each of the edges the instructions cause one or more of the computing systems to:

connect the edge with a respective pair of nodes, determine an edge measured object pose based on at least one of one or more of the measured object poses corresponding to the respective pair of nodes, and determine an edge object uncertainty measure based on at least one of one or more of the object uncertainty measures corresponding to the respective pair of the nodes, and wherein in generating the multigraph the instructions cause one or more of the computing systems to:

generate a first set of multiple of the edges, wherein the first set of the edges define a first simple path that connects the reference frame node and a given object node of the object nodes, the first set of the edges comprising a first set first edge that connects the given object node to a first object node, and a first set second edge that connects the first object node to a second object node or to the reference frame node, and generate a second set of multiple of the edges that define a second simple path that connects the reference frame node and the given object node, the second set of edges comprising a second set first edge that is in addition to the edges of the first set of the edges that define the first simple path;

generate a composite pose and composite uncertainty measure for each of a plurality of simple paths along the edges that connect the reference frame node and the given object node of the object nodes, including the first simple path and the second simple path, wherein the composite pose and the composite uncertainty measure for each of the simple paths is based on the edge measured object pose and the edge observation uncertainty measure for each of the edges of the simple path;

generate, based on the composite poses and the composite uncertainty measures, a pose and an uncertainty measure for the object identifier on which the given object node is based;

assign the pose and the uncertainty measure to the object identifier on which the given object node is based; and provide the object identifier and the pose to at least one robotic agent, of the agents in the environment, to influence control commands generated by the robotic agent.

12. The system of claim 11, wherein at least one of the observed object identifiers of the observations identifies one of the agents of the environment.

13. The system of claim 11, wherein the object identifier on which the given object node is based identifies a robotic agent of the agents of the environment.

14. The system of claim 11, wherein:

the observed object identifier of a first observation identifies a mobile robot agent of the agents and the source identifier of the first observation identifies the mobile robot agent; and the observed object identifier of a second observation identifies a non-agent object of the agents and the source identifier of the second observation identifies the mobile robot agent.

15. The system of claim 11, wherein the instructions that, when executed by the one or more computing systems, cause the computing systems to generate the pose and the uncertainty measure based on the composite pose and the composite uncertainty measure comprise instructions that cause the computing systems to:

merge the composite poses and the composite uncertainty measures for the plurality of simple paths.

16. The system of claim 15, wherein the instruction that, when executed by the one or more computing systems, cause the computing systems to merge the composite poses and the composite uncertainty measures for the plurality of simple paths comprises instructions that cause the computing systems to weight, in the merge, the composite poses and the composite uncertainty measures based on the composite uncertainty measures.

17. The system of claim 11, wherein the instruction that, when executed by the one or more computing systems, cause the computing systems to generate an edge of the edges along a simple path of the simple paths comprise instructions that cause the computing systems to:

generate the edge measured object pose and the edge observation uncertainty measure for the edge based on spherical linear interpolation of the edge measured object pose and the edge observation uncertainty measure of a first observation of the observations of the group and the edge measured object pose and the edge observation uncertainty measure of a second observation of the observations of the group, wherein the first observation and the second observation both identify the same observed object identifier and the same source identifier.

18. The system of claim 11, wherein the instruction that, when executed by the one or more computing systems, cause the computing systems to generate the composite pose and the composite uncertainty measure for each of the plurality of simple paths comprise instructions that cause the computing systems to apply an unscented transform to the edge measured object poses and the edge observation uncertainty measures for the edges of the simple path.

19. The system of claim 11, wherein the first set second edge connects the first object node to the second object node, and wherein the first set of the edges further comprise a first set third edge that connects the second object node to a third object node or to the reference frame node.

20. At least one non-transitory computer-readable medium comprising instructions that, in response to execution of the instructions by one or more processors, cause the one or more processors to perform the following operations:

receiving a plurality of observations from a plurality of agents in an environment, each of the observations generated based on sensor data from one or more sensors of a corresponding agent of the agents and including:

an observation time, a source identifier of the corresponding agent, an observed object identifier of a corresponding observed object of multiple objects of the environment, a measured object pose for the corresponding observed object, and an observation uncertainty measure for the measured object pose;

identifying a group of the observations for a target time based on the observation times of the observations of the group satisfying a threshold relative to the target time;

generating, based on the group of observations, a multigraph having a plurality of nodes and edges connecting the nodes, the generating comprising defining a reference frame node of the nodes, defining object nodes of the nodes that are based on the observed object identifiers of the group, and generating the edges connecting the nodes based on the observed object identifiers, the source identifiers, and the measured object poses and observation uncertainty measures of the group, wherein generating each of the edges comprises:
  connecting the edge with a respective pair of nodes,
  determining an edge measured object pose based on at least one of one or more of the measured object poses corresponding to the respective pair of nodes, and
  determining an edge object uncertainty measure based on at least one of one or more of the object uncertainty measures corresponding to the respective pair of the nodes, and wherein generating the multigraph comprises:
  generating a first set of multiple of the edges, wherein the first set of the edges define a first simple path that connects the reference frame node and a given object node of the object nodes, the first set of the edges comprising a first set first edge that connects the given object node to a first object node, and a first set second edge that connects the first object node to a second object node or to the reference frame node, and
  generating a second set of multiple of the edges that define a second simple path that connects the reference frame node and the given object node, the second set of edges comprising a second set first edge that is in addition to the edges of the first set of the edges that define the first simple path;

generating a composite pose and composite uncertainty measure for each of a plurality of simple paths along the edges that connect the reference frame node and the given object node, including the first simple path and the second simple path, wherein the composite pose and the composite uncertainty measure for each of the simple paths is based on the edge measured object pose and the edge observation uncertainty measure for each of the edges of the simple path;

generating, based on the composite poses and the composite uncertainty measures, a pose and an uncertainty measure for the object identifier on which the given object node is based;

assigning the pose and the uncertainty measure to the object identifier on which the given object node is based; and providing the object identifier and the pose to at least one robotic agent, of the agents in the environment, to influence control commands generated by the robotic agent.

* * * * *